(12) United States Patent
Lin et al.

(10) Patent No.: US 6,594,536 B1
(45) Date of Patent: Jul. 15, 2003

(54) METHOD AND COMPUTER PROGRAM FOR USING TOOL PERFORMANCE DATA FOR DYNAMIC DISPATCH OF WAFER PROCESSING TO INCREASE QUANTITY OF OUTPUT

(75) Inventors: Chien-Yu Lin, Taipei (TW); Li-Wen Liu, Hsinchu (TW); Ni-Chung Chen, Hsinchu (TW); Liao-Hon Wen, Banchiau (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/075,799

(22) Filed: Feb. 13, 2002

(51) Int. Cl.⁷ .............................................. G06F 19/00
(52) U.S. Cl. ........................... 700/99; 700/90; 700/121; 700/28; 438/907
(58) Field of Search ............................ 700/90, 97, 99, 700/117, 121, 28; 438/907

(56) References Cited

U.S. PATENT DOCUMENTS

| 5,612,886 A | 3/1997 | Weng |
|---|---|---|
| 5,818,716 A | 10/1998 | Chin et al. |
| 5,838,565 A | 11/1998 | Hsieh et al. |
| 5,841,677 A | 11/1998 | Yang et al. |
| 5,930,137 A | 7/1999 | Togashi |

*Primary Examiner*—Jayprakash N. Gandhi
(74) *Attorney, Agent, or Firm*—George O. Saile; Stephen B. Ackerman; Larry J. Prescott

(57) ABSTRACT

A method and computer program for dynamic matching of wafer lots waiting for processing and available tools to maximize wafer output. Wafer lot information and tool capability and availability is provides. Priority wafer lots are processed first. All permutations of the remaining non priority lots and available tools are then formed. The longest process time for each permutation is then calculated. A permutation wafers per hour, PWPH, equal to the total number of wafers processed for each permutation divided by the longest process time for that permutation is calculated. If only one permutation has the highest PWPH that permutation is selected for processing. If more than one permutation has the highest PWPH the total wafers per hour, TWPH, equal to the sum of the wafer per hour capability of each tool in the permutation is calculated for those permutations. Any permutation with the highest PWPH and TWPH is selected for processing.

30 Claims, 3 Drawing Sheets

METHOD AND COMPUTER PROGRAM FOR USING TOOL PERFORMANCE DATA FOR DYNAMIC DISPATCH OF WAFER PROCESSING TO INCREASE QUANTITY OF OUTPUT

BACKGROUND (1) Field of the Invention

This invention relates to methods of scheduling wafer lots for processing and more particularly to using tool performance capability and wafer lots awaiting processing to dynamically match tools to wafer lots to optimize wafer output.

(2) Description of the Related Art

U.S. Pat. No. 5,612,886 to Weng describes a manufacturing control system using computer control of work flow for automatic production line control.

U.S. Pat. No. 5,818,716 to Chin et al. describes a dispatching algorithm for controlling work flow in a semiconductor manufacturing factory.

U.S. Pat. No. 5,838,565 to Hsieh et al. describes a method of operating a batch sequential machine in a manufacturing plant to optimize processing lots of work through a plurality of processing stations.

U.S. Pat. No. 5,841,677 to Yang et al. describes a method and apparatus for dispatching lots in a factory.

U.S. Pat. No. 5,930,137 to Togashi describes a work supply method and apparatus for a batch process apparatus for semiconductor wafers by which work with a high priority is processed preferentially.

SUMMARY OF THE INVENTION

In semiconductor wafer fabrication facilities there is frequently a number of wafer lots waiting for processing than there are processing tools to process the lots. In addition to having more wafer lots waiting than tools available it is desirable to maximize the wafer output of the processing tools.

It is a principle objective of this invention to provide a method of matching wafer lots to available processing tools in order to maximize the output of the available processing tools.

It is another principle objective of this invention to provide a computer program for matching wafer lots to available processing tools in order to maximize the output of the available processing tools.

These objectives are achieved by gathering information for the wafer lots waiting to be processed and the processing tools capable of performing the processing. The wafers in each of the wafer lots are to be processed according to a particular processing recipe. The information for the wafer lots includes the number of wafers in each lot, the processing recipe to be used for each wafer lot, and whether any wafer lots require priority processing. The processing tools process the different recipes at different wafer per hour rates. The information for the processing tools includes the wafer per hour capability for each processing recipe.

As a first step the wafer lots with priority are identified and given precedence for associating with available processing tools. Next all the possible permutations of non priority wafer lots and processing tools are determined. The longest process time for each permutation is then calculated. A permutation wafers per hour, PWPH, is then calculated for each of the permutations. The PWPH is equal to the total number of wafers processed for each permutation of non priority wafer lots and tools divided by the longest process time for that permutation.

Next the permutations having the highest PWPH are selected. If only one permutation has the highest PWPH that permutation is selected for processing. If more than one permutation has the highest PWPH the total wafer per hour, TWPH, is calculated for the permutations having the highest PWPH. The TWPH is equal to the sum of the wafer per hour capability of each tool in the permutation. The permutations with the highest PWPH and highest TWPH are then identified. If only one permutation has the highest PWPH and the highest TWPH that permutation is selected for processing. If more than one permutation has the highest PWPH and the highest TWPH,any one of the permutations having the highest PWPH and the highest TWPH is selected for processing.

This method is then repeated for the remaining wafers to identify the next permutation for processing and continues until all the waiting non priority wafers are processed. At any time wafer lots with high priority are given precedence for available tools.

DESCRIPTION OF THE PREFERRED EMBODIMENTS

Figure 1:
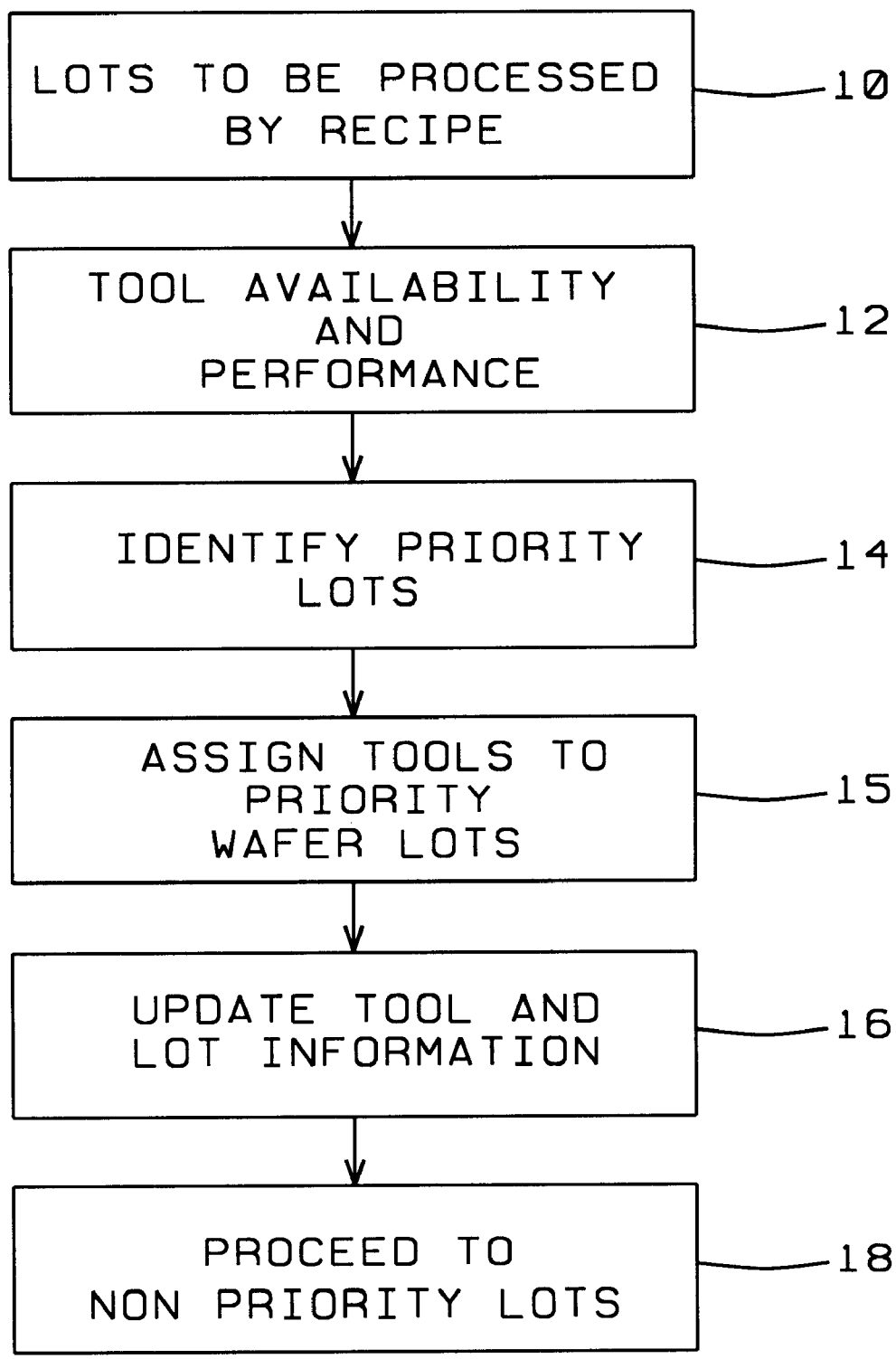
FIG. 1 shows a block diagram of the method of this invention for identifying high priority wafer lots and giving these high priority lots precedence for available tools.
Figure 2:
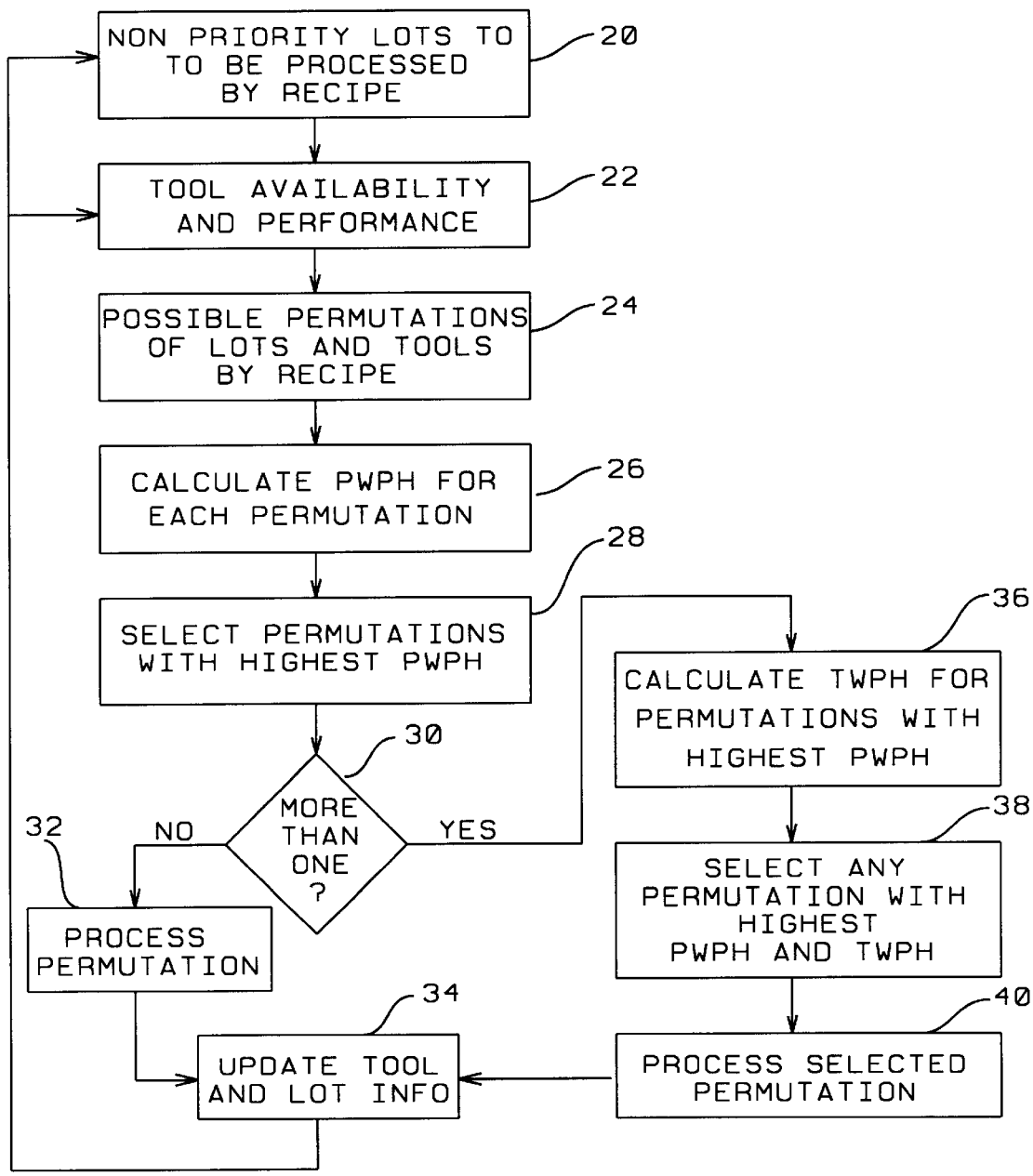
FIG. 2 shows a block diagram of the method of this invention for scheduling the processing of non priority wafer lots by available tools.
Figure 3:
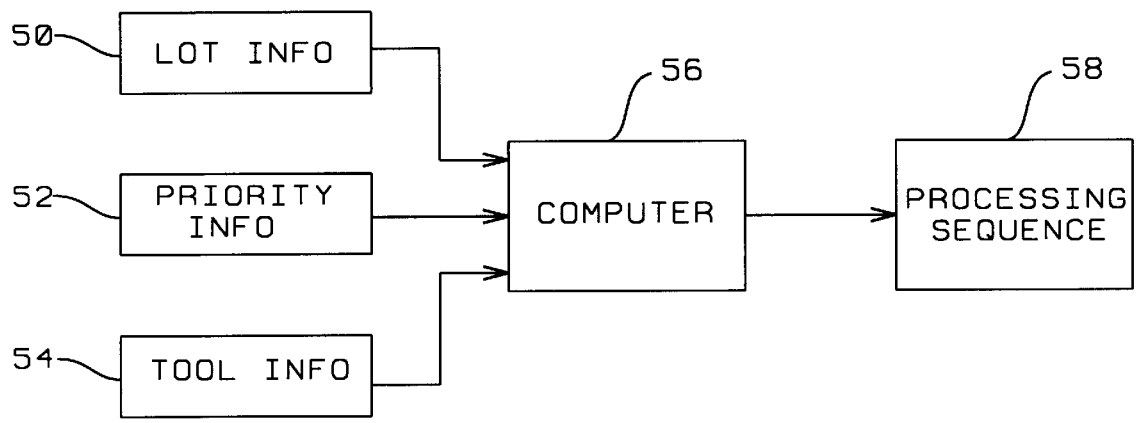
FIG. 3 shows a block diagram of the system used to implement the methods and computer programs of this invention.

Refer now to the FIGS. 1–3 for a detailed description of a preferred embodiment of the method of this invention. FIG. 1 shows a flow diagram of first part of the method program of assigning tools for wafer lot processing of this invention. As shown in FIG. 1 the first step 10 indicates a plurality of wafer lots waiting to be processed wherein each of the wafer lots is to be processed according to a particular process recipe. All the wafers of a single lot are to be processed using the same process recipe. The process recipe used for different wafer lots can be the same or can be different, but in most cases will be different.

FIG. 3 shows a block diagram of an example of a computer controlled system which can be used for this invention. As shown in FIG. 3 the wafer lot information 50 is fed into a computer 56 where it is stored in the computer memory.

As shown in the next step 12 of the flow diagram shown in FIG. 1 information about process tool availability and tool capability is provided. This tool information will include the wafer per hour, WPH, processing capability for each tool as a function of processing recipe. As shown in FIG. 3 this tool information 54 is fed into the computer 56 where it is stored in the computer memory.

As shown in the next step 14 of the flow diagram shown in FIG. 1 information about wafer lot processing priority is made available. As shown in FIG. 3 this wafer lot processing priority information 52 is fed into the computer 56 where it is stored in the computer memory. As shown in the next step 15 of the flow diagram of FIG. 1 tools are preferentially assigned to the wafer lots identified as requiring priority processing. As shown in the next step 16 the information about wafer lots to be processed and the available processing tools information is updated after tools have been assigned to the wafer lots having priority. These updates could be performed manually but preferably the updates are done in the computer 56, see FIG. 3, and the information about wafer lots to be processed and available tools in the computer memory is updated. As shown in the next step 18 in the flow diagram of FIG. 1, the method of this invention next proceeds to the processing of the non priority wafer lots.

FIG. 2 shows a flow diagram for the method for processing the non priority lots of this invention. The wafer lot information is updated to reflect the disposition of the priority wafer lots and non priority wafer lot information is provided, as indicated in the first step 20 of the flow diagram. The tool information is also updated to reflect the disposition of the priority wafer lots and updated tool information is provided, as indicated in the second step 22 of the flow diagram. Next, as indicated in the next step 24, all possible permutations of the wafer lots to be processed and available tools are formed. Preferably these permutations are determined in the computer 56, see FIG. 3.

If there are n wafer lots and p available tools, where n and p are positive integers, then the number of permutations of tools and wafer lots, N, is given by the following equation.

$$N = n(n-1)(n-2) \ldots (n-p+1).$$

As an example consider the case of four wafer lots, A, B, C, and D and three available tools $T_1$, $T_2$, and $T_3$. In this example n is 4, p is 3, n−p+1 is 2 and the number of permutations, N, is equal to 4×3×2 which is equal to 24. A table of wafer lot information for this example is shown in Table One. For this example wafer lot A has 3 wafers to be processed by process recipe $R_1$, wafer lot B has 4 wafers to be processed by process recipe $R_2$, wafer lot C has 3 wafers to be processed by process recipe $R_3$, and wafer lot D has 3 wafers to be processed by process recipe $R_3$.

TABLE ONE

WAFER LOTS

| LOT ID | NO. WAFERS | PROCESSING RECIPE |
| --- | --- | --- |
| A | 3 | $R_1$ |
| B | 4 | $R_2$ |
| C | 3 | $R_3$ |
| D | 3 | $R_3$ |

TABLE TWO

TOOL PERFORMANCE (WPH)

| | $R_1$ | $R_2$ | $R_3$ |
| --- | --- | --- | --- |
| $T_1$ | 2 | 2 | 2 |
| $T_2$ | 2 | 1 | 3 |
| $T_3$ | 1 | 2 | 3 |

Tool information for this example is given in Table Two. For this example the first tool, $T_1$, processes 2 wafers per hour, WPH, for recipe $R_1$, 2 WPH for recipe $R_2$, and 2 WPH for recipe $R_3$. For this example the second tool, $T_2$, processes 2 WPH for recipe $R_1$, 1 WPH for recipe $R_2$, and 3 WPH for recipe $R_3$. For this example the third tool, $T_3$, processes 1 WPH for recipe $R_1$, 2 WPH for recipe $R_2$, and 3 WPH for recipe $R_3$.

The 24 permutations for this example are shown in Table Three. As shown in the next step 26 of the flow diagram shown in FIG. 2, the permutation wafers per hour, PWPH, for each of the permutations of the wafer lots and tools is calculated. This calculation is preferably performed by the computer 56, see FIG. 3. The PWPH is equal to the total wafers of the permutation divided by the longest process time, LPT, of the permutation. The PWPH values, in wafers per hour, and the LPT values, in hours, for all the permutations of this example are shown in Table Three.

As an example of this calculation of PWPH consider the permutation wherein wafer lot A, with 3 wafers, is processed according to recipe $R_1$ using tool. $T_1$; wafer lot B, with 4 wafers, is processed according to recipe $R_2$ using tool $T_2$; and wafer lot C, with 3 wafers, is processed according to recipe $R_3$ using tool $T_3$. The longest process time for this permutation is wafer lot B with 4 wafers processed according to recipe $R_2$ using tool $T_2$ having a throughput capability of 1 WPH giving 4 hours for the

TABLE THREE

PERMUTATIONS

| Permutation | No. Wafers | LPT (Hrs) | PWPH | TWPH |
| --- | --- | --- | --- | --- |
| A-$T_1$, B-$T_2$, C-$T_3$ | 10 | 4.0 | 2.5 | 6 |
| A-$T_1$, B-$T_3$, C-$T_2$ | 10 | 2.0 | 5.0 | 7 |
| A-$T_2$, B-$T_1$, C-$T_3$ | 10 | 2.0 | 5.0 | 7 |
| A-$T_2$, B-$T_3$, C-$T_1$ | 10 | 2.0 | 5.0 | 6 |
| A-$T_3$, B-$T_1$, C-$T_2$ | 10 | 3.0 | 3.3 | 6 |
| A-$T_3$, B-$T_2$, C-$T_1$ | 10 | 4.0 | 2.5 | 4 |
| A-$T_1$, B-$T_2$, D-$T_3$ | 10 | 4.0 | 2.5 | 6 |
| A-$T_1$, B-$T_3$, D-$T_2$ | 10 | 2.0 | 5.0 | 7 |
| A-$T_2$, B-$T_1$, D-$T_3$ | 10 | 2.0 | 5.0 | 7 |
| A-$T_2$, B-$T_3$, D-$T_1$ | 10 | 2.0 | 5.0 | 6 |
| A-$T_3$, B-$T_1$, D-$T_2$ | 10 | 3.0 | 3.3 | 6 |
| A-$T_3$, B-$T_2$, D-$T_1$ | 10 | 4.0 | 2.5 | 4 |
| A-$T_1$, C-$T_2$, D-$T_3$ | 9 | 1.5 | 6.0 | 8 |
| A-$T_1$, C-$T_3$, D-$T_2$ | 9 | 1.5 | 6.0 | 8 |
| A-$T_2$, C-$T_1$, D-$T_3$ | 9 | 1.5 | 6.0 | 7 |
| A-$T_2$, C-$T_3$, D-$T_1$ | 9 | 1.5 | 6.0 | 7 |
| A-$T_3$, C-$T_1$, D-$T_2$ | 9 | 3.0 | 3.0 | 6 |
| A-$T_3$, C-$T_2$, D-$T_1$ | 9 | 3.0 | 3.0 | 6 |
| B-$T_1$, C-$T_2$, D-$T_3$ | 10 | 2.0 | 5.0 | 8 |
| B-$T_1$, C-$T_3$, D-$T_2$ | 10 | 2.0 | 5.0 | 8 |
| B-$T_2$, C-$T_1$, D-$T_3$ | 10 | 4.0 | 2.5 | 6 |
| B-$T_2$, C-$T_3$, D-$T_1$ | 10 | 4.0 | 2.5 | 6 |
| B-$T_3$, C-$T_1$, D-$T_2$ | 10 | 2.0 | 5.0 | 7 |
| B-$T_3$, C-$T_2$, D-$T_1$ | 10 | 2.0 | 5.0 | 7 | longest process time. There are a total of 10 wafers in this permutation so that the PWPH for this permutation is equal to 2.5 wafers per hour. The PWPH values for the permutations in this example are shown in Table Three.

As shown in the next step 28 of the flow diagram shown in FIG. 2, the permutations with the highest PWPH are selected. This selection is preferably made by the computer 56, see FIG. 3. Next as shown by the decision step 30 in FIG. 2 if there is only one permutation with the highest PWPH that permutation is processed, as shown in the next step 32. The tool information and wafer lot information are then updated, step 34 in FIG. 2, and the method is repeated as long as there are wafer lots waiting to be processed.

As shown by the decision step 30 in FIG. 2 if there is more than one permutation with the highest PWPH the total wafers per hour, TWPH, values are calculated for all of the permutations with the highest PWPH. The total wafers per hour, TWPH, is equal to the sum of the wafers per hour for the tools and wafer lots in the permutation. The TWPH values for each of the permutations are shown in Table Three for the example of 4 wafer lots and 3 processing tools. The TWPH for the calculation example of wafer lot A, with 3 wafers, processed according to recipe $R_1$ using tool $T_1$; wafer lot B, with 4 wafers, processed according to recipe $R_2$ using tool $T_2$; and wafer lot C, with 3 wafers, processed according to recipe $R_3$ using tool $T_3$ is equal to the sum of 2 wafers for tool $T_1$ processing recipe $R_1$, 1 wafer per hour for tool $T_2$ processing recipe $R_2$, and 3 wafers for tool $T_3$ processing recipe $R_3$ for a total of 6 wafers per hour.

If there is more than one permutation having the highest TWPH and the highest PWPH any one of them is selected for processing, as shown in step 38 in the flow diagram of FIG. 2. This selection is preferably made by the computer 56, see FIG. 3. The selected permutation is then processed, step 40 in FIG. 2. The tool information and wafer lot information are then updated, step 34 in FIG. 2, and the process is repeated as long as there are wafer lots waiting to be processed.

The PWPH and TWPH values for the example of 4 wafer lots and 3 processing tools are shown in Table Three. As can be seen in Table Three four permutations have the highest PWPH of 6 wafers per hour. As can be seen in Table Three there are two permutations having the highest PWPH of 6 wafers per hour and the highest TWPH of 8 wafers per hour. Either one of these permutations is selected for processing.

As shown in FIG. 3, for the example of the computer controlled method, the a computer output 58 provides the processing sequence to be used. This can be in the form of a computer printout, a computer terminal display, or the like. The computer output 58 can also be used for automatic sequencing of the wafer lot processing. The steps outlined in this embodiment can be embodied in a computer program so that the processing sequence can be determined automatically.

The method of this invention can provide sequencing of wafer processing by available tools which assures the maximum wafer per hour output.

Refer now to the FIGS. 1-2 for a description of a preferred embodiment of the computer program of this invention. FIG. 1 shows a flow diagram of first part of the computer program of assigning tools for wafer lot processing of this invention. As shown in FIG. 1 the first step 10 indicates a plurality of wafer lots waiting to be processed wherein each of the wafer lots is to be processed according to a particular process recipe. All the wafers of a single lot are to be processed using the same process recipe. The process recipe used for different wafer lots can be the same or can be different, but in most cases will be different.

As shown in the next step 12 of the flow diagram shown in FIG. 1 information about process tool availability and tool capability is provided. This tool information will include the wafer per hour, WPH, processing capability for each tool as a function of processing recipe. As shown in the next step 14 of the flow diagram shown in FIG. 1 information about wafer lot processing priority is made available. As shown in the next step 15 of the flow diagram of FIG. 1 the computer preferentially assigns tools to the wafer lots identified as requiring priority processing. As shown in the next step 16 the computer program updates the information about wafer lots to be processed and the available processing tools after tools have been assigned to the wafer lots having priority. As shown in the next step 18 in the flow diagram of FIG. 1, the computer program of this invention next proceeds to the processing of the non priority wafer lots.

FIG. 2 shows a flow diagram for the computer program for processing the non priority lots of this invention. The wafer lot information is updated to reflect the disposition of the priority wafer lots and non priority wafer lot information is provided, as indicated in the first step 20 of the flow diagram. The tool information is also updated to reflect the disposition of the priority wafer lots and updated tool information is provided, as indicated in the second step 22 of the flow diagram. Next, as indicated in the next step 24, the computer program forms all possible permutations of the wafer lots to be processed and available tools.

As shown in the next step 26 of the flow diagram shown in FIG. 2, the computer program calculates the permutation wafers per hour, PWPH, for each of the permutations of the wafer lots and tools. The PWPH is equal to the total wafers of the permutation divided by the longest process time, LPT, of the permutation.

As shown in the next step 28 of the flow diagram shown in FIG. 2, the computer program selects the permutations with the highest PWPH. Next as shown by the next step 30 in FIG. 2 the computer program determines if there is only one permutation with the highest PWPH. If so the computer program causes that permutation to be processed, as shown in the next step 32. The computer program then updates the tool information and wafer lot information, step 34 in FIG. 2, and the process is repeated as long as there are wafer lots waiting to be processed.

As shown by step 30 in FIG. 2 if the computer program determines that there are more than one permutation with the highest PWPH the program calculates the total wafers per hour, TWPH, values for all of the permutations with the highest PWPH. The total wafers per hour, TWPH, is equal to the sum of the wafers per hour for the tools and wafer lots in the permutation.

If there are more than one permutation having the highest TWPH and the highest PWPH the computer program selects any one of them for processing, as shown in step 38 in the flow diagram of FIG. 2. The program then directs that the selected permutation be, step 40 in FIG. 2. The program then updates the tool information and wafer lot information, step 34 in FIG. 2, and the program repeats as long as there are wafer lots waiting to be processed.

The computer controls a computer 56 such as shown in FIG. 3. The a computer output 58 provides the processing sequence to be used. This can be in the form of a computer printout, a computer terminal display, or the like. The computer output 58 can also be used for automatic sequencing of the wafer lot processing.

The computer program of this invention can provide sequencing of wafer processing by available tools which assures the maximum wafer per hour output.

While the invention has been particularly shown and described with reference to the preferred embodiments thereof, it will be understood by those skilled in the art that various changes in form and details may be made without departing from the spirit and scope of the invention.

What is claimed is:

1. A method of determining processing sequence, comprising:

providing a group of wafer lots wherein each of said wafer lots has wafers to be processed using a process recipe;

providing wafer lot priority information;

separating said group of wafer lots into priority wafer lots and non priority wafer wherein said priority wafer lots are to be processed before said non priority wafer lots;

providing a number of processing tools wherein each of said processing tools processes wafers according to said process recipes;

providing processing tool information wherein said processing tool information comprises processing tool availability and processing tool throughput capability, expressed in wafers per hour, for each of said processing tools processing wafers according to each of said process recipes;

forming all possible processing permutations of said non priority wafer lots and those said processing tools available for processing said non priority wafer lots;

calculating the longest process time for each of said processing permutations;

calculating a permutation wafers per hour for each of said processing permutations wherein said permutation wafers per hour is equal to the total number of wafers in one of said processing permutation divided by said longest process time for that said processing permutation;

selecting those said processing permutations having the largest said permutation wafers per hour;

calculating a total wafers per hour for those said processing permutations having the largest said permutation wafers per hour wherein said total wafers per hour is equal to the sum of the wafers per hour for each of said tools in said processing permutation;

selecting any of those said processing permutations having the largest said permutation wafers per hour and the largest said total wafers per hour;

processing said wafers in said selected processing permutation using said tools in said selected processing permutation; and repeating these steps until all of said wafer lots have been processed.

2. The method of claim 1 wherein information about said group of wafer lots including said process recipe to be used in processing each of said wafer lots is stored in a computer memory.

3. The method of claim 1 wherein information about said group of wafer lots including said process recipe to be used in processing each of said wafer lots is entered into a computer from a magnetic disk.

4. The method of claim 1 wherein information about said group of wafer lots including said process recipe to be used in processing each of said wafer lots is entered into a computer from a keyboard.

5. The method of claim 1 wherein said processing tool information is stored in a computer memory.

6. The method of claim 1 wherein said processing tool information is entered into a computer from a magnetic disk.

7. The method of claim 1 wherein said processing tool information is entered into a computer from a keyboard.

8. The method of claim 1 wherein said wafer lot priority information is stored in a computer memory.

9. The method of claim 1 wherein said wafer lot priority information is entered into a computer from a magnetic disk.

10. The method of claim 1 wherein said wafer lot priority information is entered into a computer from a keyboard.

11. The method of claim 1 wherein a list of said priority wafer lots and said non priority wafer lots is stored in a computer memory.

12. The method of claim 1 wherein said separating said group of wafer lots into priority and non priority wafer lots is performed by a computer and a list of said priority wafer lots and said non priority wafer lots is stored in said computer.

13. The method of claim 1 wherein said forming all possible permutations of said non priority wafer lots and those said processing tools available for processing said non priority wafer lots is accomplished by a computer.

14. The method of claim 1 wherein said permutation wafers per hour for each of said processing permutations is calculated by a computer.

15. The method of claim 1 wherein those of said processing permutations having the largest said permutation wafers per hour are selected by a computer.

16. The method of claim 1 wherein said total wafers per hour for each of said processing permutations having the largest said permutation wafers per hour are calculated using a computer.

17. The method of claim 1 wherein any said processing permutation having the largest said permutation wafers per hour and the largest said total wafers per hour is selected using a computer.

18. A computer program for determining processing sequence, comprising:

reading information for a group of wafer lots wherein each of said wafer lots has wafers to be processed using a process recipe;

reading wafer lot priority information for said group of wafer lots;

separating said group of wafer lots into priority wafer lots and non priority wafer wherein said priority wafer lots are to be processed before said non priority wafer lots;

reading processing tool information for a number of processing tools, wherein each of said processing tools processes wafers according to said process recipes, wherein said processing tool information comprises processing tool availability and processing tool throughput capability, expressed in wafers per hour, for each of said processing tools processing wafers according to each of said process recipes;

forming all possible processing permutations of said non priority wafer lots and those said processing tools available for processing said non priority wafer lots;

calculating the longest process time for each of said processing permutations;

calculating a permutation wafers per hour for each of said processing permutations wherein said permutation wafers per hour is equal to the total number of wafers in one of said processing permutation divided by said longest process time for that said processing permutation;

selecting those said processing permutations having the largest said permutation wafers per hour;

calculating a total wafers per hour for those said processing permutations having the largest said permutation wafers per hour wherein said total wafers per hour is equal to the sum of the wafers per hour for each of said tools in said processing permutation;

selecting any of those said processing permutations having the largest said permutation wafers per hour and the largest said total wafers per hour;

identifying said selected processing permutation; and repeating these steps until all of said wafer lots have been processed.

19. The computer program of claim 18 wherein said information for a group of wafer lots is stored in a computer memory.

20. The computer program if claim 18 wherein said wafer lot priority information is stored in a computer memory.

21. The computer program of claim 18 wherein said processing tool information is stored in a computer memory.

22. The computer program of claim 18 wherein said information for a group of wafer lots is read from a magnetic disk.

23. The computer program if claim 18 wherein said wafer lot priority information is read from a magnetic disk.

24. The computer program of claim 18 wherein said processing tool information is read from a magnetic disk.

25. The computer program of claim 18 wherein said information for a group of wafer lots is read from a computer keyboard.

26. The computer program if claim 18 wherein said wafer lot priority information is read from a computer keyboard.

27. The computer program of claim 18 wherein said processing tool information is read from a computer keyboard.

28. The computer program of claim 18 wherein said identifying said selected processing permutation comprises printing said selected processing permutation by a printer.

29. The computer program of claim 18 wherein said identifying said selected processing permutation comprises displaying said selected processing permutation by a display terminal.

30. The computer program of claim 18 wherein said identifying said selected processing permutation comprises automatic initiation of processing of said selected processing permutation.

* * * * *